United States Patent
Vigna et al.

(10) Patent No.: US 6,417,021 B1
(45) Date of Patent: Jul. 9, 2002

(54) METHOD OF FABRICATING A PIEZORESISTIVE PRESSURE SENSOR

(75) Inventors: Benedetto Vigna, Potenza; Paolo Ferrari, Gallarate; Flavio Villa, Milan, all of (IT)

(73) Assignee: SGS-Thomson Microelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/404,507

(22) Filed: Sep. 23, 1999

Related U.S. Application Data

(62) Division of application No. 08/903,168, filed on Jul. 30, 1997, now Pat. No. 6,131,466.

(30) Foreign Application Priority Data

Jul. 31, 1996 (EP) .............................................. 96830435

(51) Int. Cl.⁷ .............................................. H01L 21/00
(52) U.S. Cl. .......................... 438/53; 438/50; 438/311
(58) Field of Search .............................. 438/50, 51, 52, 438/53, 311; 257/417, 419

(56) References Cited

U.S. PATENT DOCUMENTS

| | | | |
|---|---|---|---|
| 3,893,228 A | 7/1975 | George et al. | 29/580 |
| 4,320,664 A | 3/1982 | Rehn et al. | 73/708 |
| 4,510,671 A | 4/1985 | Kurtz et al. | 29/571 |
| 4,766,666 A | 8/1988 | Sugiyama et al. | 29/610 |
| 5,095,401 A | 3/1992 | Zavracky et al. | 361/283 |
| 5,242,863 A * | 9/1993 | Xiang-Zheng et al. | 438/53 |
| 5,510,276 A | 4/1996 | Diem et al. | 437/24 |

OTHER PUBLICATIONS

*European Search Report* from European application No. 96830435.2, filed Jul. 31, 1996.

*Silicon–on–Insulator Wafer Bonding—Wafer Thinning Technological Evaluations,* Haisma et al., SGS–Thomson M i MI 02/93519473, pp. 1426–1443.

CMOS Integrated Silicon Pressure Sensor, Ishihara et al., IEEE J of Solid–State Circuits, vol. Sc–22, No. 2 Apr., 1987, pp. 151–156.

Micromachining and ASIC Technology, Stoffel, Microelectronics Journal, 25 (1994) pp. 145–156.

Novel Fully CMOS–Compatible Vacuum Sensor, Paul et al., Elsevier Science S.A. Sensors and Actuators (1995), pp. 143–146.

Surface–Micromachined Piezoresistive Pressure Sensor, Lisec et al., Sensor 95 Kongreßband pp. 21–25.

Surface–Micromachined Microdiaphragm Pressure Sensors, Sugiyama et al., Sensors and Materials, 4, 5 (1993), pp. 265–275.

Micromachining Improves Automotive Sensors, Meth, Electronic Design Report, Feb. 5, 1996, pp. 67–79.

Integrated Silicon Pressure Sensor for Automotive Application with Electronic Trimming, Kress et al., 950533, pp. 35–40.

* cited by examiner

*Primary Examiner*—Carl Whitehead, Jr.
*Assistant Examiner*—Jeff Vockrodt
(74) *Attorney, Agent, or Firm*—Wolf, Greenfield & Sacks, P.C.; James H. Morris

(57) ABSTRACT

The pressure sensor is integrated in an SOI (Silicon-on-Insulator) substrate using the insulating layer as a sacrificial layer, which is partly removed by chemical etching to form the diaphragm. To fabricate the sensor, after forming the piezoresistive elements and the electronic components integrated in the same chip, trenches are formed in the upper wafer of the substrate and extending from the surface to the layer of insulating material; the layer of insulating material is chemically etched through the trenches to form an opening beneath the diaphragm; and a dielectric layer is deposited to outwardly close the trenches and the opening. Thus, the process is greatly simplified, and numerous packaging problems eliminated.

12 Claims, 4 Drawing Sheets

METHOD OF FABRICATING A PIEZORESISTIVE PRESSURE SENSOR

CROSS REFERENCE TO RELATED APPLICATIONS

This application is a division of application Ser. No. 08/903,168, filed Jul. 30, 1997 now U.S. Pat No. 6,131,466, entitled INTEGRATED PIEZORESISTIVE PRESSURE SENSOR AND RELATIVE FABRICATION METHOD, which prior application is incorporated herein by reference.

BACKGROUND OF THE INVENTION

1. Field of the Invention

The present invention relates to an integrated piezoresistive pressure sensor and relative fabrication method.

2. Discussion of the Related Art

In recent years, micromachining techniques have been developed for producing integrated micro pressure sensors of semiconductor material, which present numerous advantages as compared with traditional sensors: low cost; high degree of performance and reliability; better signal/noise ratio; integration with memory circuits for producing intelligent sensors; on-line self-testing; and greater reproducibility. As such, integrated micro pressure sensors are now being used increasingly in the automotive industry, in which they provide for greater safety and environmental protection with absolutely no increase in vehicle cost.

Currently marketed semiconductor micro pressure sensors are substantially based on two physical effects: a piezoresistive effect, whereby the pressure-induced inflection of a silicon diaphragm unbalances a Wheatstone bridge comprising resistors diffused in the diaphragm; and a capacitive effect, whereby pressure induces a shift in the position of a diaphragm forming the movable electrode of a capacitor (thus resulting in a variation in capacitance).

The present invention relates to a sensor implementing the first effect, i.e. to a piezoresistive sensor. At present, diaphragms of semiconductor material (silicon) are produced using the bulk micromachining technique, which is described in detail, for example, in articles "CMOS Integrated Silicon Pressure Sensor," by T. Ishihara, K. Suzuki, S. Suwazono, M. Hirata and H. Tanigawa, *IEEE Journal Sol. St. Circuits*, Vol. sc-22, April 1987, pp. 151–156, and "Micromachining and ASIC Technology," by A. M. Stoffel, *Microelectronics Journal* 25 (1994) pp. 145–156.

For the sensor to operate effectively, the diaphragms should be of uniform, accurately controlled thickness with no intrinsic mechanical stress, which characteristics are achieved by forming the microstructures by plasma or wet etching, isotropic etching (for profiles coincident with the crystal faces) or anisotropic etching (for more sharply curved, continuous profiles). At present, the best etching method for producing the diaphragm, and which provides for more accurately controlling the thickness of the diaphragm and eliminating any process-induced tensile or compressive stress, is the electrochemical stop method using a PN junction whereby the diaphragm is formed in an N-type monocrystalline semiconductor layer (e.g. the epitaxial layer) on a P-type substrate; the N-type layer is masked except for a previously implanted anode contact region; the rear of the substrate is masked with a mask presenting a window aligned with the region in which the diaphragm is to be formed; a positive potential difference is applied between the N-type layer and the substrate via the anode contact region; and the P-type substrate is chemically etched for a few hours at low temperature (e.g. 90° C.). Etching terminates automatically at the PN junction, and the N-type layer at the removed substrate region forms the diaphragm.

An example of the fabrication steps of an absolute piezoresistive micro pressure sensor using the electrochemical stop method is described below with reference to FIGS. 1a, 1b and 1c.

The initial steps are those commonly adopted in the fabrication of integrated circuits. That is, commencing with a wafer 1 of monocrystalline silicon comprising a P-type substrate 2 and an N-type epitaxial layer 3, P-type junction isolating regions 4 extending from the upper surface of wafer 1 to substrate 2 are formed in epitaxial layer 3; the integrated circuit is then formed (FIG. 1a shows an NPN transistor with an $N^+$-type collector contact region 6, a P-type base region 7, and an $N^+$-type emitter region 8); and, simultaneously with the integrated circuit, the diffused resistors (only one of which, comprising a P-type resistive layer 10, is shown) and one anode region for each wafer and each diaphragm ($N^+$-type region 11 in FIG. 1a) are formed. The resistors are preferably formed in the same step in which base region 7 of the NPN transistor is implanted; and anode region 11 is formed in the same step as one of the N-type regions of the integrated circuit (e.g. when implanting collector contact region 6 or emitter region 8). A dielectric layer 12 is then deposited, and metal contacts 13 formed.

At this point, wafer 1 is masked with a front mask 15 and a rear mask 16, the front mask 15 (of silicon oxide) covering the whole of the upper surface of wafer 1 except for a window at anode region 11, and the rear mask 16 (of silicon nitride or oxide) covering the whole of the lower surface of the wafer except for the region in which the diaphragm is to be formed, as shown in FIG. 1b. The rear of the wafer is then subjected to anisotropic etching; at the same time, epitaxial layer 3 is biased, via anode region 11, at a positive voltage (e.g. 5 V) with respect to substrate 2. Anisotropic etching terminates automatically at epitaxial layer 3; and the portion of epitaxial layer 3 at the removed portion of substrate 2 forms the diaphragm 18.

Following removal of masks 15 and 16, wafer 1 is bonded to a sheet of glass 17 (FIG. 1c) using the anodic bonding method whereby a medium-high voltage (e.g. 500 V) is applied between wafer 1 and sheet 17 for a few hours at a temperature of 300 to 400° C.; and, finally, sheet 17 is fixed to container 19.

The above method presents the following drawbacks: it is incompatible with batch processing techniques, due to the electric contacts on each wafer; rear etching of wafer 1 poses problems in terms of front-rear alignment; the thickness of wafer 1 demands prolonged etching; the scaling problems involved are such as to preclude the integration of structures smaller than a few hundred micrometers; and, once the diaphragm is formed, wafer 1 must invariably be bonded to a glass support, both for absolute and differential sensors (which require holes aligned with the diaphragm, thus posing further alignment problems).

On account of the above drawbacks, which make it difficult to integrate the method in currently used integrated circuit technology, several micro pressure sensor manufacturers have opted to form an integrated double chip: one chip contains the diaphragm microstructure, while the other provides for processing the signal. Single-chip integrated sensors also exist, but are not batch processed.

Several industrial laboratories and research centers have produced prototype integrated microstructures using the surface micromachining technique. Details of these are to be found, for example, in the following articles: "Novel Fully CMOS-Compatible Vacuum Sensor," by O. Paul, H. Baltes, in *Sensors and Actuators A* 46–47 (1995), pp. 143–146, in which a diaphragm of dielectric material is formed on a sacrificial metal layer; "Surface-Micromachined Piezoresistive Pressure Sensor," by T. Lisec, H. Stauch, B. Wagner, in *Sensor 95 Kongressband*, A01.2, pp. 21–25, in which both the sacrificial polysilicon layer and a silicon nitride layer as the diaphragm.

Though they do in fact provide for better integration of the devices, the above surface micromachining techniques pose serious problems such as the quality of the films (amorphous or polycrystalline) deposited to form the diaphragms, collapse of the suspended structures on the silicon substrate, and packaging difficulties.

It is an object of the present invention to provide an integrated piezoresistive sensor and relative fabrication method, designed to overcome the aforementioned drawbacks.

SUMMARY OF THE INVENTION

According to the present invention, there is provided an integrated piezoresistive pressure sensor and a relative fabrication method. The integrated piezoresistive pressure sensor comprises a diaphragm formed in a body of semiconductor material and a number of piezoresistive elements formed in said diaphragm. The body of the semiconductor material is an SOI substrate.

In practice, according to the present invention, the sensor exploits a SOI (Silicon-on-Insulator) substrate to form the diaphragm, and the insulating layer forms the sacrificial layer removed partly by chemical etching to form the diaphragm, thus greatly simplifying the process and eliminating many of the packaging problems involved.

BRIEF DESCRIPTION OF THE DRAWINGS

Two preferred, non-limiting embodiments of the present invention will be described by way of example with reference to the accompanying drawings, in which.

DETAILED DESCRIPTION

Figure 1A:
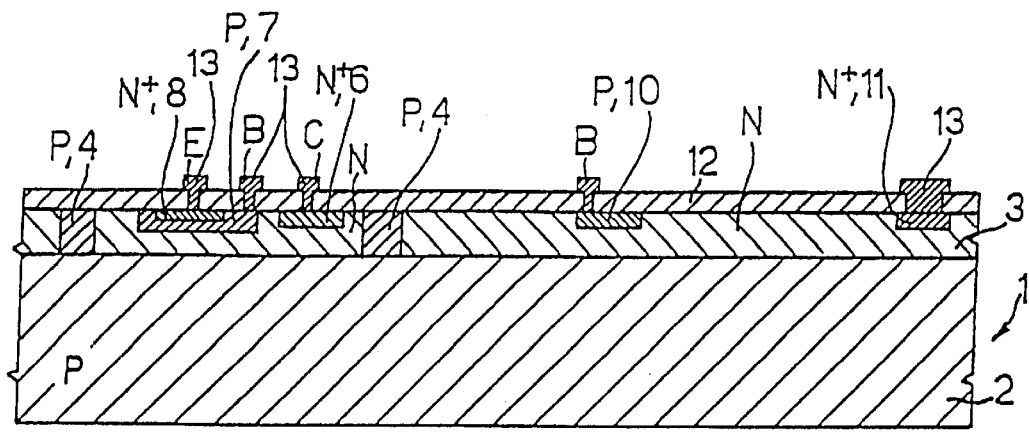
FIGS. 1a, 1b and 1c show cross sections of a wafer of semiconductor material at successive steps in the fabrication of a known sensor.
Figure 1B:
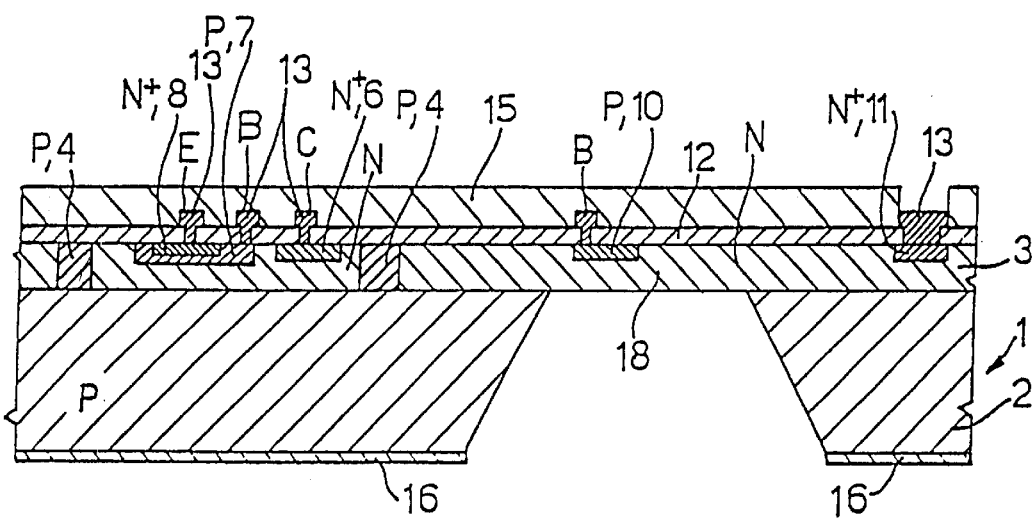
Figure 1C:
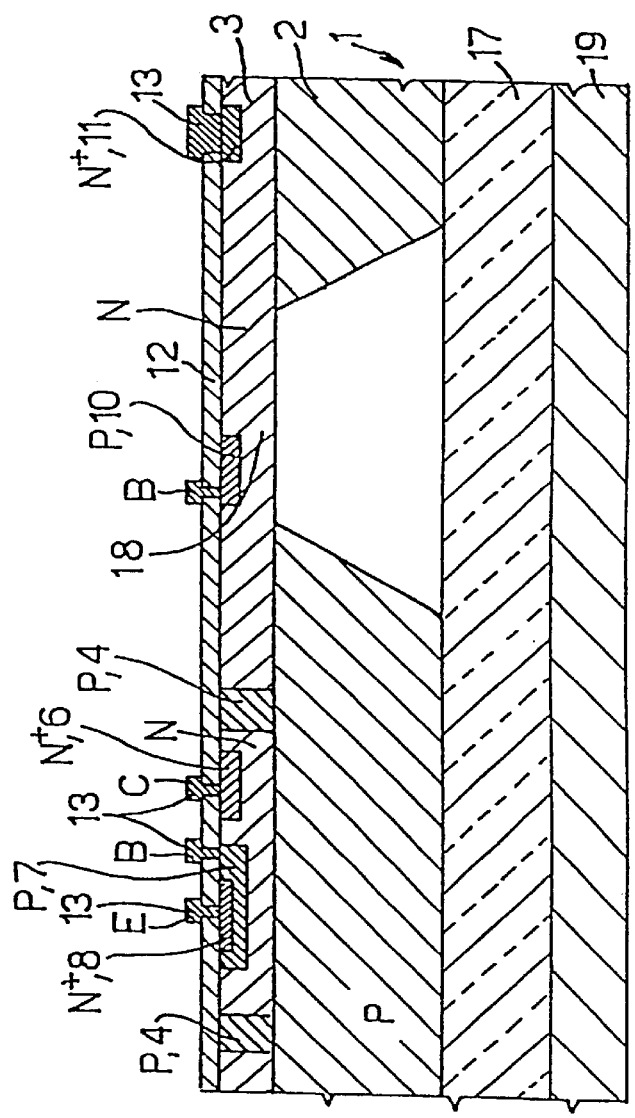
Figure 2A:
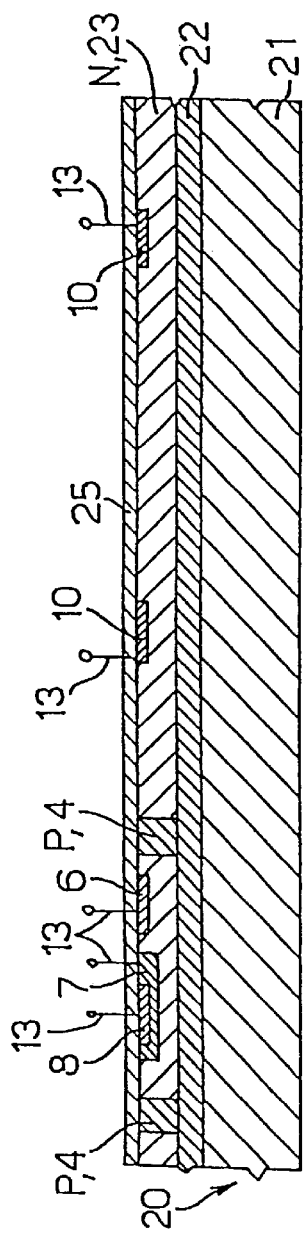
FIGS. 2a, 2b and 2c show cross sections of a wafer of semiconductor material at successive steps in the fabrication of the sensor according to the present invention.
Figure 2B:
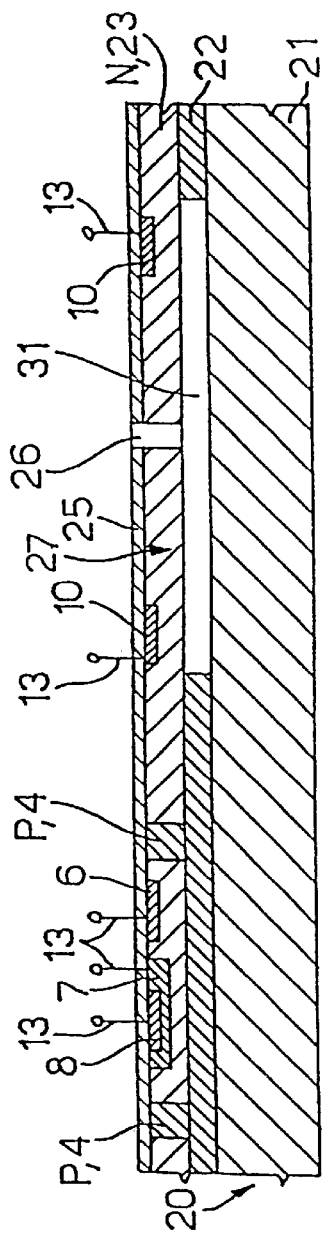

The sensor according to the present invention is formed from a SOI substrate formed in known manner. In the FIG. 2a example, the SOI substrate forms a first wafer 20 comprising an actual substrate region 21 of monocrystalline silicon of any conductivity type (P or N) superimposed with an, e.g. SiO$_2$, insulating layer 22 deposited or grown thermally, and to which a second monocrystalline silicon wafer 23, in this case an N-type, is bonded in known manner (e.g. as described in the article entitled: "Silicon-on-Insulator Wafer Bonding-Wafer Thinning Technological Evaluations," by J. Hausman, G. A. Spierings, U.K.P. Bierman and J.A. Pals, *Japanese Journal of Applied Physics*, Vol. 28, N. 8, August 1989, pp. 1426–1443). The thickness of insulating layer 22 is preferably 600 to 1200 nm. The thickness of the second wafer 23 depends, as explained below, on the full scale pressure of the sensor, diaphragm size and fabrication parameters, and roughly ranges between 5 and 10 μm.

As of first wafer 20, the standard fabrication steps described above are performed to form junction isolating regions 4, the integrated electronic components (regions 6–8) and diffused P-type piezoresistors 10, but, unlike the known method, anode region 11 is not formed.

Figure 3A:
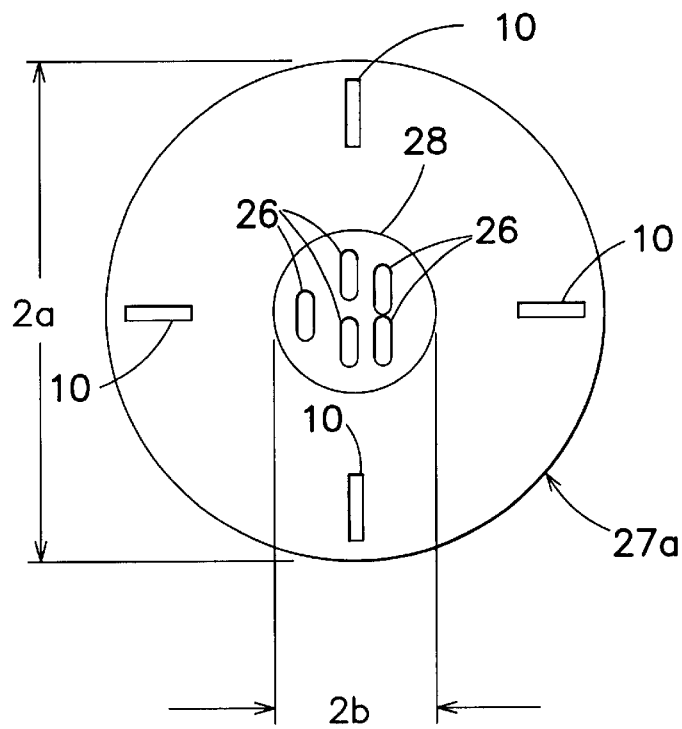
FIG. 3a shows a top plan view of a detail of the sensor according to the present invention.
Figure 3B:
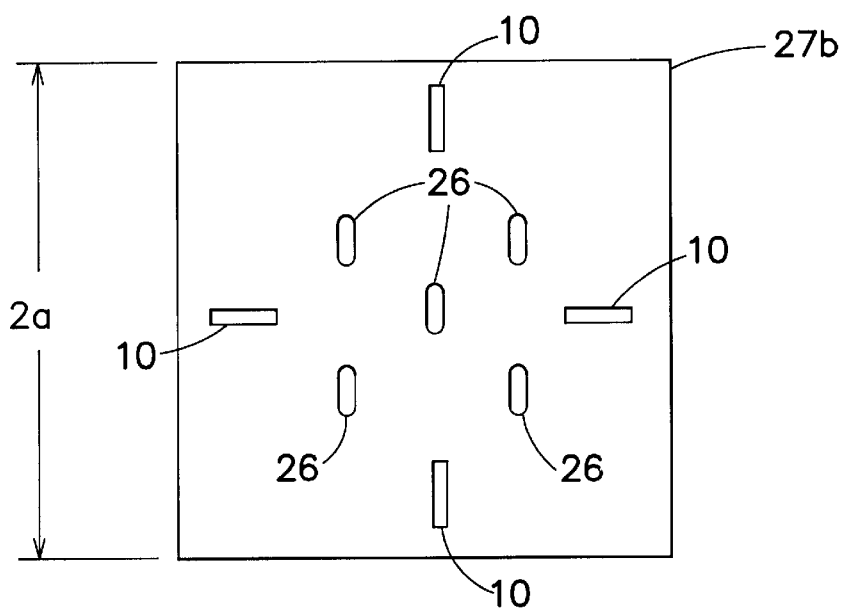
FIG. 3b shows a top plan view of a different embodiment of the sensor according to the present invention.

At this point, according to the method of the present invention, the upper face is covered with a deposited plasma nitride layer (layer 25 in FIG. 2a), which acts as a first passivation layer and as a mask for forming trenches in second wafer 23. Nitride layer 25 is etched photolithographically and provides, at a subsequent etching step, for forming a number of trenches 26 in second wafer 23, as shown in FIGS. 3a and 3b.

First wafer 20 is then etched with hydrofluoric acid, which penetrates trenches 26 in second wafer 23 to remove part of buried insulating layer 22 and form an opening or window 31 in layer 22, so that the portion of second wafer 23 over opening 31 forms the diaphragm 27. By appropriately regulating the etching time of insulating layer 22 and the location of trenches 26, diaphragm 27 may be shaped and sized as required, and more specifically in such a manner as to ensure piezoresistors 10 are located at the edges of diaphragm 27, i.e. in the maximum pressure-induced stress region. FIG. 3a, for example, shows a first embodiment in which the diaphragm (27a) is circular, and trenches 26 are formed at the center of the diaphragm, inside a circle 28 concentric with circle 27a. In a second embodiment shown in FIG. 3b, the diaphragm (27b) is square and trenches 26 arranged appropriately.

At this point, a dielectric (e.g. USG-Undoped Silicon Glass) layer 30 is deposited to cover the top of trenches 26, insulate trenches 26 and opening 31 (FIG. 2c), and so eliminate the anodic bonding step called for in the bulk micromachining method. The first wafer 20 so formed may then be subjected to the usual finish operations—comprising cutting, packaging and direct connection of the die to the container—with no alterations as compared with standard IC processes.

The size of diaphragm 27 and circle 28 (trench region) typically depend on the pressure measuring range according to the equations shown below.

Figure 2C:
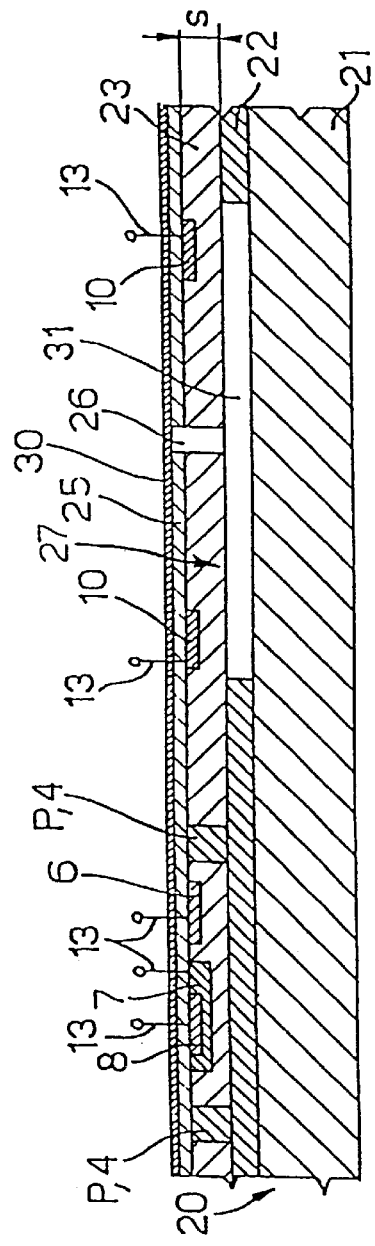

In the FIG. 3a embodiment—in which diaphragm 27a is circular with a radius a, circle 28 presents a radius b, and pressure P is evenly distributed over the surface—maximum stress S$_{max}$ and maximum vertical deflection W$_{max}$ equal:

$$S_{max} = k\,P\,(a/s)^2$$

$$W_{max} = h\,P\,(a^4/Es^3) \tag{1}$$

where s is the thickness of the diaphragm (thickness of second wafer 23, FIG. 2c); E is the Young's modulus of monocrystalline silicon (130 GPascals); and k and h are numbers depending on how the diaphragm is anchored and on ratio a/b. For ratio a/b values of 1.25 to 5, k ranges between 0.1 and 0.73, and h between 0.002 and 0.17.

Bearing in mind that the maximum stress withstandable by silicon is roughly 4000 bars, and if Q is the full scale pressure of the sensor in bars, the following equation applies:

$$(a/s)^2 = 0.8*10^3/(k*Q)$$

Conversely, in the case of a square diaphragm of side 2a (FIG. 3b) and with no change in the other parameters, equation (1) equals:

$$W_{max} = h\,P\,(a^4/Es^3)/3 \tag{1'}$$

The advantages of the sensor and fabrication method described are as follows: the fabrication method is compatible with batch processing, and, therefore, provides for exploiting the same economic advantages; the sensor may be fully integrated with the signal processing circuit, so that the sensor and all the processing logic may be contained in one chip, thus reducing size, signal transmission time and sensitivity to external phenomena; no problems exist as regards front-rear alignment; spatial integration of the sensor is comparable with surface-micromachined structures and greater by one or two orders of magnitude as compared with bulk-micromachined sensors; by featuring a monocrystalline silicon diaphragm, the mechanical characteristics of the sensor are superior to those of deposited films typical of surface-micromachined structures; and, finally, by eliminating the need for a glass support, no anodic bonding is required.

Clearly, changes may be made to the sensor and fabrication method as described and illustrated herein without, however, departing from the scope of the present invention. In particular, the conductivity of the various regions may be other than as shown, e.g. the conductivity of the second wafer and the piezoelectric resistors may be dual; components of any type and compatible technology may be integrated in the structure; and isolating regions 4 may be of a type other than as shown, e.g. dielectric.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of fabricating an integrated piezoresistive pressure sensor comprising the steps of:
   forming an SOI substrate having a diaphragm;
   forming piezoresistive element in said diaphragm;
   wherein said step of forming an SOI substrate comprises the step of forming by bonding a body of semiconductor material having a first wafer of monocrystalline semiconductor material, a layer of insulating material over said first wafer, and a second wafer of monocrystalline semiconductor material over said layer of insulating material;
   wherein said step of forming a diaphragm comprises the steps of:
      forming at least one trench through said second wafer and extending up to said layer of insulating material;
      forming an opening in said layer of insulating material by chemical etching through said at least one trench; and
   depositing a layer of dielectric material on said second wafer; said layer of dielectric material outwardly closing said at least one trench and not extending into said opening.

2. A method as claimed in claim 1 further comprising the step of bonding said body of semiconductor material directly to a container.

3. A method according to claim 1, wherein the dielectric material is Undoped Silicon Glass (USG).

4. A method of fabricating an integrated piezoresistive pressure sensor comprising the steps of:
   forming a diaphragm in a body of semiconductor material;
   forming piezoresistive elements in said diaphragm;
   wherein the step of forming a diaphragm comprises the step of forming by bonding a body of semiconductor material having a first layer of monocrystalline semiconductor material, a layer of insulating material over said first layer of monocrystalline semiconductor material and a second layer of monocrystalline semiconductor over said layer of insulating material;
   wherein said step for forming a diaphragm comprises the steps of forming at least one trench through said second layer of monocrystalline semiconductor material; said at least one trench extending to said layer of insulating material; and forming an opening in said layer of insulating material by etching through said at least one trench; and
   depositing a dielectric material on said second layer of monocrystalline semiconductor material, said dielectric material outwardly closing said at least one trench and not extending into said opening.

5. The method of claim 4 further comprising the step of bonding said body of semiconductor material to a container.

6. A method according to claim 4, wherein the dielectric material is Undoped Silicon Glass (USG).

7. A method of fabricating an integrated piezoresistive pressure sensor comprising the steps of:
   providing a first monocrystalline semiconductor region;
   superimposing an insulating layer over said first monocrystalline semiconductor region;
   bonding a second monocrystalline semiconductor region on said insulating layer;
   providing an air gap in the intermediate insulating layer so that the portion of the second monocrystalline semiconductor region over the air gap forms a diaphragm;
   forming semiconductor piezoresistive elements in said diaphragm;
   forming at least one trench through said second region and extending up to said insulating layer;
   forming an opening in said insulating layer by chemical etching through said at least one trench; and
   depositing a layer of dielectric material on said second monocrystalline region; said layer of dielectric material outwardly closing said at least one trench and not extending into said opening.

8. The method of claim 7, further comprising the step of bonding said first monocrystalline semiconductor region to a container.

9. A method according to claim 7, wherein the dielectric material is Undoped Silicon Glass (USG).

10. A method of fabricating an integrated piezoresistive pressure sensor comprising the steps of:
    providing a first and second monocrystalline region;
    bonding the first and second monocrystalline regions through an intermediate insulating layer;
    forming a diaphragm in the second monocrystalline region over an air gap that is defined in the intermediate insulating layer;
    forming semiconductor piezoresistive elements in said diaphragm;
    forming at least one trench through said second region and extending up to said insulating layer;
    forming an opening in the insulating layer by chemical etching through said at least one trench; and
    depositing a layer of dielectric material on said second monocrystalline region; said layer of dielectric material outwardly closing said at least one trench and not extending into said opening.

11. The method of claim 10, further comprising the step of bonding said first monocrystalline semiconductor region to a container.

12. A method according to claim 10, wherein the dielectric material is Undoped Silicon Glass (USG).

* * * * *